United States Patent
Simon et al.

[11] 3,905,977
[45] Sept. 16, 1975

[54] OCTAHYDROMORPHANTHRIDINES

[75] Inventors: Edward Simon, East Brunswick; David B. Reisner, Hightstown; Bernard J. Ludwig, North Brunswick; John J. Harakal, Lakewood; Milton Kletzkin, East Brunswick, all of N.J.

[73] Assignee: Carter-Wallace, Inc., New York, N.Y.

[22] Filed: Dec. 6, 1974

[21] Appl. No.: 530,275

[52] U.S. Cl. .................. 260/239 D; 424/244
[51] Int. Cl.² ........................... C07D 223/20
[58] Field of Search .................. 260/239 D

[56] References Cited
UNITED STATES PATENTS

| | | | |
|---|---|---|---|
| 2,861,987 | 11/1958 | Martin et al. | 260/239 D |
| 3,153,652 | 10/1964 | Drukher et al. | 260/239 D |
| 3,316,245 | 4/1967 | Drukher et al. | 260/239 D |
| 3,316,246 | 4/1967 | Drukher et al. | 260/239 D |
| 3,381,000 | 4/1968 | Drukher et al. | 260/239 D |

FOREIGN PATENTS OR APPLICATIONS
834,281   5/1960   United Kingdom............ 260/239 D Primary Examiner—Donald G. Daus
Assistant Examiner—D. B. Springer
Attorney, Agent, or Firm—Kevin B. Clarke

[57] ABSTRACT

Novel octahydromorphanthridines of the formula:

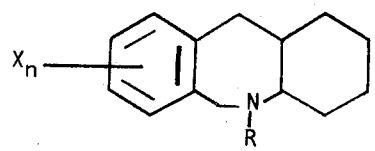

wherein X is hydrogen, chlorine or lower alkyl, $n$ is 1 except when X is chlorine when $n$ is 1 or 2, R is hydrogen or lower alkyl.

15 Claims, No Drawings

OCTAHYDROMORPHANTHRIDINES

This invention relates to a new class of compounds having the following structural formula:

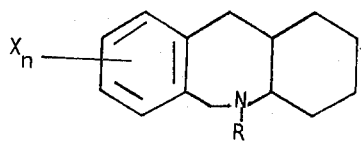

wherein X is hydrogen, chlorine or lower alkyl, $n$ is 1 except when X is chlorine when $n$ is 1 or 2 and R is hydrogen or lower alkyl. As used herein and in the appended claims, the term "lower alkyl" shall mean alkyl radicals containing 1 to 6 carbon atoms.

These compounds can exist and can be used in the form of the free base or as an acid addition salt thereof prepared by treating the free base with a pharmacologically acceptable acid.

The 1,2,3,4,4a,5,6,11a-octahydromorphanthridines, where X is hydrogen or lower alkyl and R is hydrogen, are obtained by the hydrogenation of the appropriate 5,6-dihydromorphanthridine in the presence of a suitable catalyst. The starting 5,6-dihydromorphanthridine can be secured by hydrogenating a morphanthridine in the presence of a suitable catalyst or by reducing a morphanthridin-6(5H)-one with a metal hydride such as lithium aluminum hydride or sodium bis(2-methoxyethoxy)aluminum hydride.

When it is desired to prepare a 1,2,3,4,4a,5,6,11a-octahydromorphanthridine where X is hydrogen, one or two atoms of chlorine or lower alkyl and the nitrogen is substituted with a lower alkyl group, the appropriate octahydromorphanthridine is: (1) alkylated with an alkyl halide or (2) acylated with an acid halide or an acid anhydride and then reduced with a metal hydride or (3) reductively alkylated with an aliphatic aldehyde and formic acid or (4) reductively alkylated with an aliphatic aldehyde and hydrogen in the presence of a catalyst.

The 9-chloro and 7,9-dichloro-octahydromorphanthridines can be prepared by first converting 1,2,3,4,4-a,5,6,11a-octahydromorphanthridine to the 5-chloroacetyl derivative, then chlorinating the amide under controlled conditions for mono- or dichlorination, and finally removing the chloroacetyl group with hot alcohol solution containing dry hydrogen chloride gas.

The acid addition salts of the novel compounds of the invention are prepared by treating the free base with a pharmacologically acceptable acid in a suitable solvent.

Table 1, which follows, sets forth the physical characteristics of a representative number of the novel compounds.

The following non-limiting examples are illustrative of the preferred methods for preparing a representative number of the novel compounds of this invention.

EXAMPLE 1

Preparation of 1,2,3,4,4a,5,6,11a-octahydromorphanthridine

A mixture of 500 g (2.56 moles) or 5,6-dihydromorphanthridine, 10 g of platinum dioxide and 1400 ml of glacial acetic acid was hydrogenated in a stirring autoclave at ambient temperature and initial pressure of 500 pounds. After absorption of 2400 pounds of hydrogen, the solution was filtered and the acetic acid was removed under reduced pressure. The residual semisolid was dissolved in 2 l. of water, 15 g of charcoal was added and the mixture was filtered through diatomaceous earth. The filtrate was made strongly basic with potassium hydroxide, cooled and extracted into 3 l. of pentane. The pentane solution was dried over calcium sulfate, concentrated to 1 l., chilled in a freezer overnight and filtered, yielding 350 g of 1,2,3,4,4a,5,6,11a-octahydromorphanthridine, mp 45°–50°C. This material was used in the next reaction without further purification. A sample prepared for analysis by recrystallization from pentane melted at 51°–52.5°C.

Anal. Calcd. for $C_{14}H_{19}N$: C, 83.53; H, 9.51; N, 6.96. Found: C, 83.32; H, 9.60; N, 6.98.

TABLE 1

| Compound No. | X | R | Salt | Solvent | Recryst. Mp, °C | Formula | Carbon Calcd. | Carbon Found | Hydrogen Calcd. | Hydrogen Found | Nitrogen Calcd. | Nitrogen Found | Chlorine Calcd. | Chlorine Found |
|---|---|---|---|---|---|---|---|---|---|---|---|---|---|---|
| 1 | H | H | HCl | $Me_2CO$ | 213–215 | $C_{14}H_{20}ClN$ | 70.74 | 70.52 | 8.42 | 8.55 | 5.89 | 5.72 | 14.95 | 14.76 |
| 2 | 9-Cl | H | HCl | EtOAc-$CHCl_3$ | 235–240 | $C_{14}H_{19}Cl_2N$ | 61.77 | 61.60 | 7.04 | 6.86 | 5.14 | 5.18 | 26.05 | 26.21 |
| 3 | 7,9-diCl | H | HCl | $Me_2CO$ | 284–285 | $C_{14}H_{18}Cl_3N$ | 54.83 | 55.05 | 5.92 | 6.00 | 4.57 | 4.60 | 34.68 | 34.70 |
| 4 | 8-$CH_3$ | H | HOAc | $Me_2CO$ | 130–132 | $C_{17}H_{25}NO_2$ | 74.14 | 73.63 | 9.15 | 8.92 | 5.09 | 4.72 | | |
| 5 | 9-Cl | $CH_3$ | HCl | EtOAc-$CHCl_3$ | 262 d. | $C_{15}H_{21}Cl_2N$ | 62.94 | 62.90 | 7.39 | 7.30 | 4.89 | 4.84 | 24.76 | 24.80 |
| 6 | H | $CH_3$ | HCl | $Me_2CO$ | 242–243 | $C_{15}H_{22}ClN$ | 71.55 | 71.63 | 8.81 | 8.90 | 5.56 | 5.43 | 14.08 | 14.18 |
| 7 | H | $C_2H_5$ | HCl | MEK | 230–231 | $C_{16}H_{24}ClN$ | 72.29 | 72.49 | 9.10 | 9.21 | 5.27 | 5.36 | 13.34 | 13.14 |
| 8 | H | $C_4H_9$ | HCl | $Me_2CO$ | 218–220 | $C_{18}H_{28}ClN$ | 73.57 | 73.48 | 9.60 | 9.70 | 4.77 | 4.72 | 12.06 | 12.18 |

EXAMPLE 2

Preparation of 1,2,3,4,4a,5,6,11a-octahydromorphanthridine hydrochloride (Compound 1)

65 g of the base, prepared as described in Example 1, was dissolved in 500 ml of ethanol, and the solution

EXAMPLE 3

Preparation of
5-chloroacetyl-1,2,3,4,4a,5,6,11a-octahydromorphanthridine was treated with dry hydrogen chloride until pH 3 was reached. The solvent was removed in vacuo, and the residual oil was dissolved in acetone. The acetone solution was stirred for 3 hours, and the crystals that formed were removed by filtration. The hydrochloride, after drying at 100°C, weighed 66.5 g.

A solution of 300 g (1.49 moles) of 1,2,3,4,4a,5,6,11a-octahydromorphanthridine in 600 ml of chloroform was cooled in an ice bath and stirred. 185 g (1.64 moles) of chloroacetyl chloride in 200 ml of chloroform was added dropwise over a period of 1.5 hours. The resultant solution was stirred and heated at reflux for 2 hours and then poured onto 1 kg of ice. The chloroform was separated and washed 3 times with water, dried over calcium sulfate and evaporated to a residual semisolid. On triturating with ethyl acetate, a crystalline product weighing 305 g was obtained. After recrystallization from ethanol, the purified product melted at 142°–144°C.

Anal. Calcd. for $C_{16}H_{20}ClNO$: C, 69.16; H, 7.24; Cl, 12.76; N, 5.04.

Found: C, 69.31; H, 7.40; Cl, 12.57; N, 5.12.

EXAMPLE 4

Preparation of
9-chloro-5-chloroacetyl-1,2,3,4,4a,5,6,11a-octahydromorphanthridine Chlorine gas (2.5 g, 0.036 mole) was bubbled into a cold solution of 10 g (0.036 mole) of 5-chloroacetyl-1,2,3,4,4a,5,6,11a-octahydromorphanthridine and 2 g (0.0123 mole) of ferric chloride in chloroform. The solution was allowed to stand overnight at room temperature, water was added and the organic layer was separated, dried and evaporated to dryness. The residual gum crystallized on triturating with methanol. The solid was recrystallized from methanol to yield 6 g of 9-chloro-5-chloroacetyl-1,2,3,4,4a,5,6,11a-octahydromorphanthridine, mp 148°–150°C.

Anal. Calcd. for $C_{16}H_{19}Cl_2NO$: C, 61.55; H, 6.13; Cl, 22.71; N, 4.49.

Found: C, 61.59; H, 6.19; Cl, 22.60; N, 4.70.

EXAMPLE 5

Preparation of
7,9-dichloro-5-chloroacetyl-1,2,3,4,4a,5,6,11a-octahydromorphanthridine The chlorination of 5-chloroacetyl-1,2,3,4,4a,5,6,11a-octahydromorphanthridine was carried out as described in Example 4 except that a 4 to 1 molar ratio of chlorine was used and the reaction mixture was allowed to stand for 48 hours instead of 24 hours. Water was added to the mixture and the chloroform solution was separated, dried and evaporated to dryness. Anhydrous ethyl ether was added to the residual oil and on standing crystallization occurred. The crystals were removed and recrystallized from methanol. The product melted at 146-148°C.

Anal. Calcd. for $C_{16}H_{18}Cl_3NO$: C, 55.44; H, 5.23; Cl, 30.68; N, 4.04.

Found: C, 55.13; H, 5.32; Cl, 30.54; N, 3.91.

EXAMPLE 6

Preparation of
9-chloro-1,2,3,4,4a,5,6,11a-octahydromorphanthridine hydrochloride (Compound 2)

10 g of 9-chloro-5-chloroacetyl-1,2,3,4,4a,5,6,11a-octahydromorphanthridine was dissolved in 150 ml of ethanol, and the solution was saturated with dry hydrogen chloride. The resulting solution was heated at reflux for 48 hours, evaporated to dryness, and the residue was dissolved in water. The aqueous solution was washed with chloroform, made strongly basic with sodium hydroxide, and the liberated base was extracted into chloroform. The chloroform solution was washed with water, dried over Drierite, and evaporated to dryness. The residue was dissolved in acetone, and the solution was treated with dry hydrogen chloride. Ether was added to induce crystallization, and the solid was removed, dried and recrystallized.

EXAMPLE 7

Preparation of
7,9-dichloro-1,2,3,4,4a,5,6,11a-octahydromorphanthridine hydrochloride (Compound 3)

1.2 g of 7,9-dichloro-5-chloroacetyl-1,2,3,4,4a,5,6,11a-octahydromorphanthridine was converted to 7,9-dichloro-1,2,3,4,4a,5,6,11a-octahydromorphanthridine hydrochloride as described in Example 6 except that ether was used instead of chloroform to wash the acidic aqueous solution and to extract the organic base after the addition of sodium hydroxide.

EXAMPLE 8

Preparation of
8-methyl-1,2,3,4,4a,5,6,11a-octahydromorphanthridine acetate (Compound 4)

8-Methylmorphanthridin-6(5H)-one (4.2 g) was mixed with 20 ml of a 70 percent solution of sodium bis(2-methoxyethoxy)-aluminum hydride in toluene and 50 ml of benzene. The mixture was stirred and heated on a steam bath for 2 hours and then treated with 100 ml of 10 percent aqueous sodium hydroxide. The resulting mixture was extracted with ether and the organic solution was washed with water, dried, and evaporated to dryness yielding 4 g of crude 8-methyl-5,6-dihydromorphanthridine. The solid recrystallized from methanol melted at 113°–115°C. The purified solid (1.3 g) was dissolved in 150 ml of glacial acetic acid and hydrogenated in the presence of platinum dioxide in a Parr hydrogenation apparatus. The mixture was filtered, concentrated in vacuo and the residue was recrystallized from acetone. The acetic acid salt melted at 130°–132°C.

Compounds 5 and 6 in Table 1 were prepared as described in Example 9.

EXAMPLE 9

Preparation of
9-chloro-5-methyl-1,2,3,4,4a,5,6,11a-octahydromorphanthridine hydrochloride (Compound 5)

To a solution of 3.3 g of 9-chloro-1,2,3,4,4a,5,6,11a-octahydromorphanthridine in 10 ml of 90 percent formic acid was added 5 ml of 37 percent aqueous formaldehyde. The solution was heated on a steam bath for 48 hours, and then 100 ml of 10 percent hydrochloric acid was added. The solution was washed with ether, made alkaline with 20 percent aqueous sodium hydroxide and extracted with chloroform. The chloroform solution was washed with water, dried and evaporated to dryness. The oil was dissolved in anhydrous ether and treated with dry hydrogen chloride. The solid was removed by filtration and recrystallized. The product weighed 1.3 g.

EXAMPLE 10

Preparation of 5-acetyl-1,2,3,4,4a,5,6,11a-octahydromorphanthridine

To a solution of 12.9 g of 1,2,3,4,4a,5,6,11a-octahydromorphanthridine in 30 ml of pyridine and 50 ml of chloroform was added dropwise with stirring, 7.0 g of acetic anhydride. The mixture was stirred and heated under reflux for 1 hour and poured onto ice. Dilute hydrochloric acid was added and the chloroform solution was spearated. The aqueous solution was washed several times with chloroform, and the chloroform solutions were combined, washed with water, dried and evaporated to dryness. The oil was triturated with isopropyl ether and the solid that formed was removed and recrystallized from isopropyl ether. The purified amide weighed 9.0 g and melted at 82°–84°C.

Anal. Calcd. for $C_{16}H_{21}NO$: C, 78.97; H, 8.70; N, 5.76.

Found: C, 78.97; H, 8.68; N, 5.94.

EXAMPLE 11

Preparation of 5-ethyl-1,2,3,4,4a,5,6,11a-octahydromorphanthridine hydrochloride (Compound 7)

A solution of 5 g of 5-acetyl-1,2,3,4,4a,5,6,11a-octahydromorphanthridine in absolute ether was added dropwise with stirring to a mixture of 1.6 g of lithium aluminum hydride and tetrahydrofuran. The mixture was stirred at room temperature overnight. A small amount of ethyl acetate was added, and the mixture was poured into ice water. After filtering, the cake was washed with ether, and the organic layer of the filtrate was separated and extracted with 10 percent hydrochloric acid. The aqueous solution was made alkaline with 10 percent aqueous sodium hydroxide, and the liberated organic base was extracted into ether. The ether solution was dried and charged with dry hydrogen chloride. After recrystalization, the hydrochloride weighed 3.4 g.

EXAMPLE 12

Preparation of 5-butyl-1,2,3,4,4a,5,6,11a-octahydromorphanthridine hydrochloride (Compound 8)

A mixture of 6.1 g of 1,2,3,4,4a,5,6,11a-octahydromorphanthridine, 4.2 g of butyraldehyde, 0.15 g of 5 percent palladiumcarbon catalyst and 100 ml of ethanol was shaken with hydrogen in a Parr hydrogenation apparatus at approximately 60°C. The catalyst was removed by filtration, and the filtrate was concentrated to dryness. The residue was dissolved in 10 percent hydrochloric acid, and the solution was washed with ether, made alkaline with 10 percent aqueous sodium hydroxide and extracted with ether. The ether solution was washed with water, dried and saturated with dry hydrogen chloride. The product, after recrystallization, weighed 1.9 g.

The following is an example of another method for the preparation of Compound 8.

EXAMPLE 13

Preparation of 5-butyl-1,2,3,4,4a,5,6,11a-octahydromorphanthridine hydrochloride (Compound 8)

A solution of 10 g of 1,2,3,4,4a,5,6,11a-octahydromorphanthridine, 25 g of butyraldehyde in 20 ml of formic acid was heated on a steam bath for 2 hours and then poured into water. Dilute hydrochloric acid was added, and the solution was washed with ether and then made alkaline with 10 percent aqueous sodium hydroxide. The organic base was isolated and converted to the hydrochloride as described in Example 12. The product obtained by this method was identical to the product prepared according to the procedure given in Example 12.

Example 14 illustrates the method of alkylating a 1,2,3,4,4a,5,6,11a-octahydromorphanthridine with an alkyl halide.

EXAMPLE 14

Preparation of 5-ethyl-1,2,3,4,4a,5,6,11a-octahydromorphanthridine hydrochloride (Compound 7)

1 g of 1,2,3,4,4a,5,6,11a-octahydromorphanthridine, 0.85 g of ethyl iodide and 50 ml of acetone were stirred and heated at reflux for 2 hours. The solvent was removed in vacuo and the residue was dissolved in water, 10 percent aqueous sodium hydroxide was added and the oil was extracted into ether. The ether solution was dried and evaporated to dryness. A sample of the solid residue was recrystallized from isopropyl ether giving the purified base of Compound 7 melting at 68°–69°C. The remainder of the crude base was dissolved in acetone, and the solution was charged with dry hydrogen chloride. An equal volume of ether was added to induce crystallization. The solid was removed by filtration and recyrstallized from MEK. It was identical, in every respect, to the product obtained by the method described in Example 11.

The compounds of this invention are useful as diuretic agents. A description of the biological assay procedure employed in establishing the diuretic activity of a representative compound of the invention is as follows.

Diuretic Effect of Octahydromorphanthridine in Hydrated Rats

Nonfasted, male, Charles River albino rats, weighing 120–160 g, were used for the test. 1,2,3,4,4a,5,6,11a-octahydromorphanthridine was given orally at a concentration which would provide the desired dose as indicated in Table II in a volume of 1 ml/100 g body weight. Immediately after drug dosing, the rats were hydrated by giving 25 ml/kg of tap water orally. Control rats received orally 1 ml/100 g of 1 percent acacia followed by 25 ml/kg of tap water.

After dosing the rats were placed in pairs in metabolism cages without food or water. Urine was collected in graduate cylinders and 6 hours later total urine volumes were recorded. Samples were analyzed for urine electrolytes Na, K and Cl, and total microequivalents excreted was calculated. Ratio between drug volumes and control volume was also calculated.

The foregoing examples are intended to be illustative only and are not intended to limit or otherwise restrict the scope of the present invention which is set forth in the appended claims.

TABLE 11

Diuretic Effect of 1,2,3,4,4a,5,6,11a-Octahydromorphanthridine Hydrochloride (Compound 1) in Hydrated Rats

| Dose mg/kg PO | No. of Animals | Urine, vol. ml | pH | μ eq/Liter | | | μ eq/Total Vol. | | |
|---|---|---|---|---|---|---|---|---|---|
| | | | | $Na^+$ | $K^+$ | $Cl^-$ | $Na^+$ | $K^+$ | $Cl^-$ |
| Control | 10 | 9.4 ±0.6 | 7.08 ±0.07 | 27 ±2 | 54 ±6 | 32 ±2 | 256 ±29 | 499 ±43 | 300 ±15 |
| 25 | 10 | 15.9 ±0.6 | 7.28 ±0.11 | 47 ±4 | 56 ±2 | 45 ±4 | 727 ±68 | 898 ±61 | 724 ±71 |
| 50 | 10 | 19.2 ±1.0 | 7.25 ±0.07 | 56 ±2 | 49 ±3 | 50 ±4 | 1083 ±61 | 945 ±68 | 956 ±71 |
| 100 | 10 | 17.3 ±0.4 | 7.51 ±0.05 | 74 ±3 | 54 ±5 | 57 ±1 | 1286 ±67 | 938 ±89 | 1019 ±60 |

What is claimed is:

1. A compound of the formula:

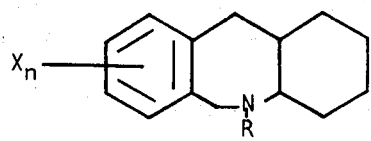

and the pharmaceutically accepted salts thereof wherein X is hydrogen, chlorine or lower alkyl, n is 1 except when X is chlorine n is 1 or 2 and R is hydrogen or lower alkyl.

2. A compound of claim 1 wherein X is hydrogen and R is lower alkyl.

3. A compound of claim 1 wherein X is chlorine and R is hydrogen.

4. A compound of claim 1 wherein X is chlorine and R is lower alkyl.

5. A compound of claim 1 wherein X is lower alkyl and R is hydrogen.

6. A compound of claim 1 wherein X is lower alkyl and R is lower alkyl.

7. 1,2,3,4,4a,5,6,11a-Octahydromorphanthridine 8. 1,2,3,4,4a,5,6,11a-Octahydromorphanthridine hydrochloride 9. 9-Chloro-1,2,3,4,4a,5,6,11a-octahydromorphanthridine hydrochloride 10. 7,9-Dichloro-1,2,3,4,4a,5,6,11a-octahydromorphanthridine hydrochloride 11. 8-Methyl-1,2,3,4,4a,5,6,11a-octahydromorphanthridine acetate 12. 9-Chloro-5-methyl-1,2,3,4,4a,5,6,11a-octahydromorphanthridine hydrochloride 13. 5-Methyl-1,2,3,4,4a,5,6,11a-octahydromorphanthridine hydrochloride 14. 5-Ethyl-1,2,3,4,4a,5,6,11a-octahydromorphanthridine hydrochloride 15. 5-Butyl-1,2,3,4,4a,5,6,11a-octahydromorphanthridine hydrochloride

* * * * *